United States Patent
Choi

(10) Patent No.: US 8,555,071 B2
(45) Date of Patent: *Oct. 8, 2013

(54) METHOD OF MANAGING METADATA

(75) Inventor: Yang-lim Choi, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 647 days.

This patent is subject to a terminal disclaimer.

(21) Appl. No.: 11/980,642

(22) Filed: Oct. 31, 2007

(65) Prior Publication Data

US 2008/0072054 A1     Mar. 20, 2008

Related U.S. Application Data

(63) Continuation of application No. 10/662,812, filed on Sep. 16, 2003.

(60) Provisional application No. 60/410,816, filed on Sep. 16, 2002, provisional application No. 60/418,160, filed on Oct. 15, 2002, provisional application No. 60/425,259, filed on Nov. 12, 2002.

(30) Foreign Application Priority Data

Mar. 3, 2003   (KR) .................... 2003-13002

(51) Int. Cl.
*H04L 9/32*      (2006.01)
*G06F 11/30*     (2006.01)
*G06F 12/14*     (2006.01)

(52) U.S. Cl.
USPC ............... 713/176; 713/189; 705/1; 705/50; 709/207; 709/218

(58) Field of Classification Search
USPC ........................................ 713/176; 717/100
See application file for complete search history.

(56) References Cited

U.S. PATENT DOCUMENTS 5,473,691 A   12/1995 Menezes et al.
5,646,941 A    7/1997 Nishimura
(Continued)

FOREIGN PATENT DOCUMENTS

JP    11-306068    5/1999
JP    2000.224257  8/2000
(Continued)

OTHER PUBLICATIONS

Korean Office Action for corresponding Korean Patent Application No. 10-2003-0013002 dated Dec. 10, 2008.
(Continued)

*Primary Examiner* — Nathan Flynn
*Assistant Examiner* — Trang Doan
(74) *Attorney, Agent, or Firm* — Staas & Halsey LLP

(57) ABSTRACT

Managing metadata in a metadata transmission server by generating a plurality of metadata fragment data by partitioning metadata to be transmitted based upon predetermined segment units, selecting predetermined metadata fragment data from among the plurality of the metadata fragment data, generating metadata-related authentication information using the selected metadata fragment data, and transmitting the selected metadata fragment data and the metadata-related authentication information including data format information indicating type of the selected metadata fragment data. A metadata receiving client uses the transmitted metadata fragment data, the metadata-related authentication information and the metadata format type information to authenticate the received metadata.

30 Claims, 10 Drawing Sheets

(56) References Cited

U.S. PATENT DOCUMENTS

| | | | |
|---|---|---|---|
| 5,768,526 A | | 6/1998 | Fawcett |
| 5,995,630 A | * | 11/1999 | Borza ..................... 380/54 |
| 6,055,522 A | | 4/2000 | Krishna et al. |
| 6,167,385 A | | 12/2000 | Beek et al. |
| 6,173,316 B1 | | 1/2001 | De Boor et al. |
| 6,226,618 B1 | | 5/2001 | Downs et al. |
| 6,247,045 B1 | | 6/2001 | Shaw et al. |
| 6,314,468 B1 | * | 11/2001 | Murphy et al. ............ 709/236 |
| 6,367,012 B1 | * | 4/2002 | Atkinson et al. ........... 713/176 |
| 6,823,436 B2 | | 11/2004 | Krishnamurthy |
| 6,959,288 B1 | | 10/2005 | Medina et al. |
| 6,959,384 B1 | | 10/2005 | Serret-Avila |
| 7,130,885 B2 | | 10/2006 | Chandra et al. |
| 7,209,571 B2 | | 4/2007 | Davis et al. |
| 2002/0001395 A1 | | 1/2002 | Davis et al. |
| 2002/0002468 A1 | * | 1/2002 | Spagna et al. ............... 705/1 |
| 2002/0103920 A1 | | 8/2002 | Berkun et al. |
| 2002/0138582 A1 | | 9/2002 | Chandra et al. |
| 2002/0188614 A1 | * | 12/2002 | King ....................... 707/100 |
| 2002/0194484 A1 | * | 12/2002 | Bolosky et al. ............ 713/189 |
| 2003/0081791 A1 | | 5/2003 | Erickson et al. |
| 2003/0120928 A1 | | 6/2003 | Cato et al. |
| 2003/0126432 A1 | | 7/2003 | Tonisson |
| 2003/0135464 A1 | * | 7/2003 | Mourad et al. .............. 705/50 |
| 2003/0185397 A1 | | 10/2003 | Ishiguro |
| 2003/0217165 A1 | | 11/2003 | Buch et al. |
| 2004/0054779 A1 | | 3/2004 | Takeshima et al. |
| 2007/0277245 A1 | | 11/2007 | Goto et al. |
| 2009/0074183 A1 | | 3/2009 | Asadu |

FOREIGN PATENT DOCUMENTS

| | | |
|---|---|---|
| JP | 2001-274788 | 10/2001 |
| JP | 2002-057662 | 2/2002 |
| JP | 2002-063147 | 2/2002 |
| JP | 2003-051816 | 2/2003 |
| JP | 2003-234737 | 8/2003 |
| JP | 2003-248737 | 9/2003 |
| JP | 2004-072184 | 3/2004 |
| JP | 2004-102951 | 4/2004 |
| JP | 2005-085089 | 10/2005 |
| KR | 2000-0033213 | 6/2000 |
| KR | 2002-0070199 | 5/2002 |
| KR | 2002-0045328 | 6/2002 |
| KR | 2002-0063830 | 8/2002 |
| KR | 2002-0070477 | 9/2002 |
| KR | 2002-70477 | 9/2002 |
| WO | WO01/52178 A1 | 7/2001 |
| WO | WO0152178 | 7/2001 |
| WO | WO02/23903 A1 | 3/2002 |

OTHER PUBLICATIONS

Supplementary European Search Report for corresponding European Patent Application No. 03808905.8 dated Dec. 23, 2008, 3 pgs (in English).
Japanese Office Action for corresponding Japanese Patent Application No. 2005-501356 dated Mar. 17, 2009 (2 pgs).
U.S Office Action mailed Feb. 2, 2007 for parent U.S. Appl. No. 10/662,812.
U.S Office Action mailed Aug. 1, 2007 for parent U.S. Appl. No. 10/662,812.
Office Action mailed Jan. 9, 2008 for parent U.S. Appl. No. 10/662,812.
U.S Office Action mailed Jul. 8, 2008 for parent U.S. Appl. No. 10/662,812.
U.S Office Action mailed Aug. 19, 2008 for parent U.S. Appl. No. 10/662,812.
U.S Office Action mailed Jan. 15, 2009 for parent U.S. Appl. No. 10/662,812.
U.S Office Action mailed May 11, 2009 for parent U.S. Appl. No. 10/662,812.
Japanese Office Action for corresponding Japanese Patent Application No. 2005-501356 dated Jun. 10, 2008 (15 pgs).
PCT International Search Report in PCT international application No. PCT/KR03/00713, which is an international application related to the present US application, mailed Jun. 12, 2003.
English language International Search Report dated May 29, 2003 of the PCT International Application No. PCT/KR03/00713, which corresponds to the above-identified pending US patent application.
Chinese Office Action for corresponding Chinese Patent Application No. 038243091 dated Aug. 10, 2007.
Office Action dated Dec. 24, 2009 for related U.S. Appl. No. 10/662,812.
Korean Office Action for corresponding Korean Patent Application No. 10-2003-0013002 dated Dec. 10, 2007.
Final Office Action dated Aug. 4, 2011 for related U.S. Appl. No. 10/662,812.
Japanese Office Action for corresponding Japanese Patent Application No. 2007-284414 dated Nov. 16, 2010, 5 pgs.
Office Action dated Feb. 1, 2011 for related U.S. Appl. No. 10/662,812.
Final Office Action dated Aug. 3, 2010 for related U.S. Appl. No. 10/662,812.
U.S. Notice of Allowance mailed Jun. 20, 2012 in related U.S. Appl. No. 10/662,812.
Stephen Farrell et al, "Assertions and Protocol for the OASIS Security Assertion Markup Language (SAML)", Committee Specification 01, May 31, 2002, pp. 1-47.
Anne Anderson et al., "Oasis eXtensible Access Control Markup Language (XACML)", Committee Specification 1.0, Nov. 7, 2002, pp. 1-129.
Takeshi Imamura, "XML Encryption Syntax and Processing, W3C Proposed Recommendation", Oct. 3, 2002, pp. 1-45.
Mark Bartel et al., "XML-Signature Syntax and Processing" W3C Recommendation, Feb. 12, 2002, pp. 1-57.

* cited by examiner

FIG. 4

```
<SOAP:Envelope ...>
  <SOAP:Header>
      <Signature fragrefID = 1>
          <Algorithm ID=1>
          <Digest> ... <\Digest>
          <SignatureValue> ... </SignatureValue>
          <KeyInfo> ... </KeyInfo>
          <SignatureValueBaseType>Text</SignatureValueBaseType>
          <Authentication Level> Transport </Authentication Level
      </Signature>
  </SOAP:Header>
<SOAP:Body>
  <TVAmetadataFragment id=1>
      <ProgramInformation>...</ProgramInformation>
  </TVAmetadataFragment>
  <TVAmetadataFragment id=2>
      <SegmentInformation>...</SegmentInformation>
  </TVAmetadataFragment>
</SOAP:Body>
</SOAP:Envelope>
```

FIG. 11

```xml
<?xml version="1.0" encoding="utf-8"?>
<SOAP:Envelope xmlns:SOAP="http://schemas.xmlsoap.org/soap/envelope/"
        xmlns:xsd="http://www.w3.org/2001/XMLSchema"
        xmlns:xsi="http://www.w3.org/2001/XMLSchema-instance">
  <SOAP:Header>
    <wssec:credentials xmlns:wssec="http://schemas.xmlsoap.org/ws/2001/10/security">
      <ds:KeyInfo xmlns:ds="http://www.w3.org/2000/09/xmldsig#" Id="SigningCertificate">
        <ds:X509Data>
          <ds:X509Certificate>MIIH1zCCBr+gAwIBA...</ds:X509Certificate>
        </ds:X509Data>
      </ds:KeyInfo>
    </wssec:credentials>

<wssec:integrity xmlns:wssec="http://schemas.xmlsoap.org/ws/2001/10/security">
      <ds:Signature xmlns:ds="http://www.w3.org/2000/09/xmldsig#">
        <ds:SignedInfo>
          <ds:CanonicalizationMethod Algorithm="http://www.w3.org/TR/2001/xml-exc-c14n#"/>
          <ds:SignatureMethod Algorithm="http://www.w3.org/2000/09/xmldsig#rsa-sha1"/>
          <ds:Reference URI="">
            <ds:Transforms>
              <ds:Transform Algorithm="http://schemas.xmlsoap.org/2001/10/security
                      #RoutingSignatureTransform"/>
              <ds:Transform Algorithm="http://www.w3.org/TR/2001/REC-xml-c14n-20010315"/>
            </ds:Transforms>
            <ds:DigestMethod Algorithm="http://www.w3.org/2000/09/xmldsig#sha1"/>
            <ds:DigestValue>j6lwx3rvEPOOvKtMup4NbeVu8nk=</ds:DigestValue>
          </ds:Reference>
        </ds:SignedInfo>
        <ds:SignatureValue>aiYECAxNqK2PivQaRweWajXup5zJa...</ds:SignatureValue>
        <ds:KeyInfo>
          <wssec:licenseLocation>
            #SigningCertificate
          </wssec:licenseLocation>
        </ds:KeyInfo>
      </ds:Signature>
    </wssec:integrity>
  </SOAP:Header>

<SOAP:Body>
    <TVAmetadataFragment>
      <ProgramInformation>.....</ProgramInformation>
        <enc:EncryptedData>
          <enc:EncryptionMethod Algorithm="xxx_algorithm"/>
          <ds:KeyInfo>.....</ds:KeyInfo>
          <enc:CipherData>
            <enc:CipherValue>9osy8Tw2+HcSHftHg...</enc:CipherValue>
          </enc:CipherData>
        </enc:EncryptedData>

<enc:EncryptedKey>
            <enc:EncryptionMethod Algorithm="yyy_algorithm"/>
          <ds:KeyInfo>
            <ds:KeyName>Public/Private Key for TVA metadata</ds:KeyName>
          </ds:KeyInfo>
          <enc:CipherData>
            <enc:CipherValue>CCBPowCwYDVROPBA...</enc:CipherValue>
          </enc:CipherData>
        </enc:EncryptedKey>
    </TVAmetadataFragment>
  </SOAP:Body>
</SOAP:Envelope>
```

METHOD OF MANAGING METADATA

CROSS-REFERENCE TO RELATED APPLICATIONS

This application is a continuation application of co-pending Ser. No. 10/662,812 filed Sep. 16, 2003, now pending, and claims the priority benefit of Korean Patent Application No. 2003-13002, filed on Mar. 3, 2003, in the Korean Intellectual Property Office, and U.S. Provisional Patent Application Nos. 60/410,816, 60/418,160, and 60/425,259, filed on Sep. 16, 2002, Oct. 15, 2002 and Nov. 12, 2002, respectively, in the U.S. Patent & Trademark Office, the disclosures of which are incorporated herein in their entirety by reference.

BACKGROUND OF THE INVENTION

1. Field of the Invention

The present invention relates to a method of managing metadata in a transmission server and a client that receives the metadata, and more particularly, to a method of managing metadata including authentication of a message source, message integrity, and message confidentiality, until a client receives the metadata.

2. Description of the Related Art

In a multimedia system, such as a broadcasting system where data is transmitted from a server to a client, or in a video-on-demand service system where data is transmitted through interactions between the server and the client, a service provider provides multimedia content and its related metadata to a client. The metadata transmitted to the client may be used for various purposes. For example, the metadata can be used by the client to select multimedia content to be reproduced, recorded, or transmitted.

In recent years, the amount and complexity of data that can be contained in metadata used by a client of a broadcasting system have increased. Thus, there has been an increasing demand for security of such metadata. In particular, in a case where metadata is generated and then transmitted to a client from a transmission server, it is very important to authenticate a source of the metadata and verify whether the integrity and confidentiality of the metadata have been affected during the transmission process. However, a metadata management method and system that effectively and efficiently authenticates metadata has not yet been proposed.

SUMMARY OF THE INVENTION

The present invention provides a method of managing metadata to be transmitted by a metadata transmission server so that authentication of the metadata to be transmitted can be effectively and efficiently performed.

The present invention also provides a method of managing in a client metadata received from a transmission server so that authentication of the received metadata can be effectively and efficiently performed.

Additional aspects and advantages of the invention will be set forth in part in the description which follows and, in part, will be obvious from the description, or may be learned by practice of the invention.

The present invention may be achieved by a method of managing metadata in a metadata transmission server, comprising generating a plurality of fragment data by partitioning metadata to be transmitted based upon a predetermined segment unit, selecting a predetermined fragment data from among the plurality of generated fragment data, generating metadata-related information using the selected fragment data, and transmitting the selected fragment data and the metadata-related information with data format information indicating a type of the selected fragment data.

The present invention may be also achieved by a method of managing metadata in a client receiving metadata, comprising reading a predetermined fragment data, metadata-related information corresponding to the read predetermined fragment data and data format information indicating a type of the predetermined fragment data, from the received metadata, generating metadata-related information using the predetermined fragment data and the corresponding data format information, and determining authentication of the received metadata by comparing the generated metadata-related information with the read metadata-related information.

The present invention may be also achieved by a method of managing metadata in a client receiving metadata, comprising receiving fragment data of the received metadata, metadata-related information, data format information indicating a type of the fragment data, metadata authentication information, and an encrypted first encryption key, generating metadata-related information using the received metadata fragment data and the corresponding data format information, decrypting the encrypted first encryption key using a second encryption key stored in the client, generating metadata authentication signature information using the generated metadata-related information and the decrypted first encryption key, and determining authentication of the received metadata by comparing the generated metadata authentication signature information with the received metadata authentication signature information.

The present invention relates to a system and method of managing metadata in a transmission server and a client device, by identifying whether metadata has been damaged during transmission from the transmission server to the client device and effectively verifying which service provider or metadata content provider has transmitted the corresponding metadata to the client device.

BRIEF DESCRIPTION OF THE DRAWINGS

The above and/or other aspects and advantages of the present invention will become apparent and more readily appreciated from the following description of the embodiments taken in conjunction with the accompanying drawings in which:

FIG. 4 is a SOAP message source code used for metadata container-level authentication in a bi-directional channel, according to an embodiment of the invention;

FIG. 11 is a more detailed SOAP message source code used in the bi-directional channel shown in FIG. 4.

DETAILED DESCRIPTION OF THE PREFERRED EMBODIMENTS

Figure 1:
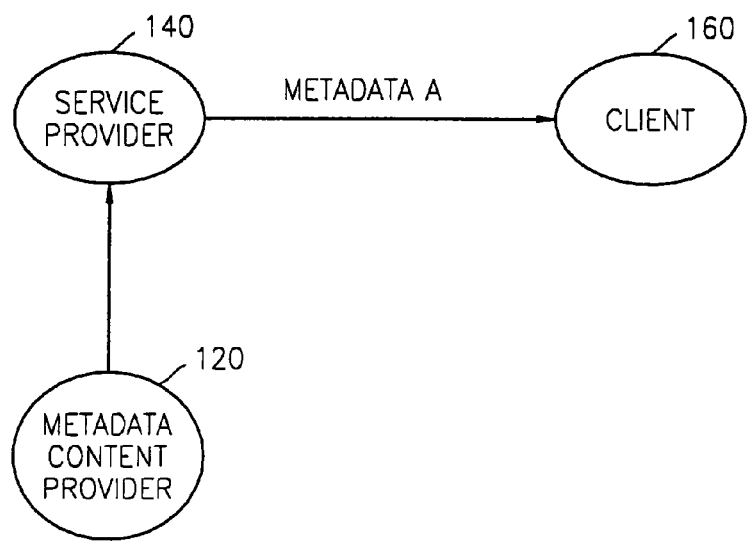
FIG. 1 is a block diagram illustrating metadata authentication levels.

Reference will now be made in detail to the present embodiments of the present invention, examples of which are illustrated in the accompanying drawings, wherein like reference numerals refer to the like elements throughout. The embodiments are described below to explain the present invention by referring to the figures.

FIG. 1 is a block diagram illustrating metadata authentication levels. When metadata is received, it is necessary to authenticate the received metadata. Metadata authentication may be performed at a transmission level or at a source level. In particular, transmission-level metadata authentication comprises authentication of a metadata message source, message integrity, and message confidentiality. In transmission-level authentication, the message source is not a source from which a message, i.e., metadata content, is generated, but a source from which the message is transmitted. For example, in a case where a metadata content provider 120 and a service provider 140, such as SK TELECOM CORP, are separately provided as shown in FIG. 1, it can be verified through transmission-level authentication of a message source whether metadata A received by a client 160 has been transmitted from the service provider 140.

In addition, transmission-level authentication of message integrity verifies whether the metadata A has been changed during transmitting the metadata A from the service provider 140 to the client 160. Transmission-level authentication of message confidentiality verifies whether the metadata A has not yet been disclosed to a third party during the transmission process. These three transmission-level authentication processes are performed, for example, using an SSL/TLS (Secure Sockets Layer/Transport Layer Security) algorithm in a TCP/IP protocol, a DTCP algorithm in an IEEE 1394 protocol, and an HDCP algorithm in a DVI protocol.

Like the transmission-level authentication, source-level metadata authentication also includes authentication of a metadata message source, message integrity, and message confidentiality. In particular, source-level authentication of a message source verifies a source from which a message, i.e., metadata content, is generated. For example, as shown in FIG. 1, source-level authentication of a message source of the metadata A shows that the metadata A received by the client 160 has been transmitted from the metadata content provider 120.

In addition, source-level authentication of message integrity verifies whether the metadata A has been changed during the transmitting the metadata A from the metadata content provider 120 to the client 160. Source-level authentication of message confidentiality verifies whether the metadata A has not yet been disclosed to a third party during the transmission of the metadata A between the metadata content provider 120 and the client 160. Typically, when such a source-level metadata authentication is performed, transmission-level metadata authentication may not need to be performed.

Figure 2:
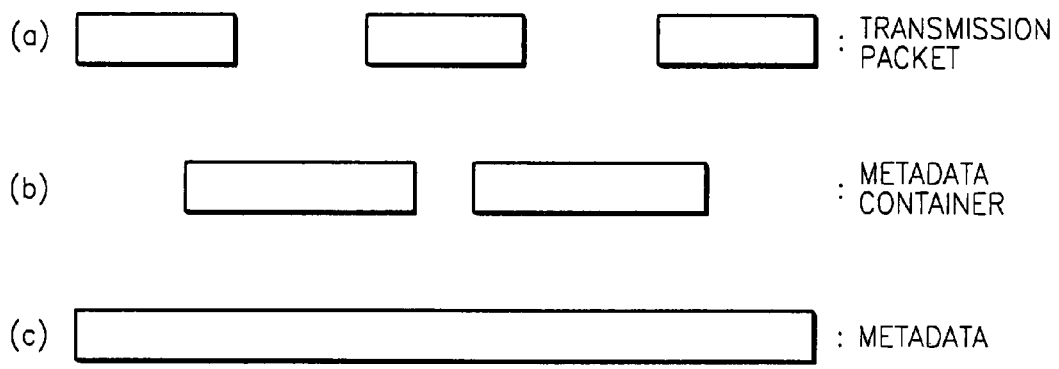
FIG. 2 is a diagram illustrating a method of transmitting data using different transmission units.
Figure 3:
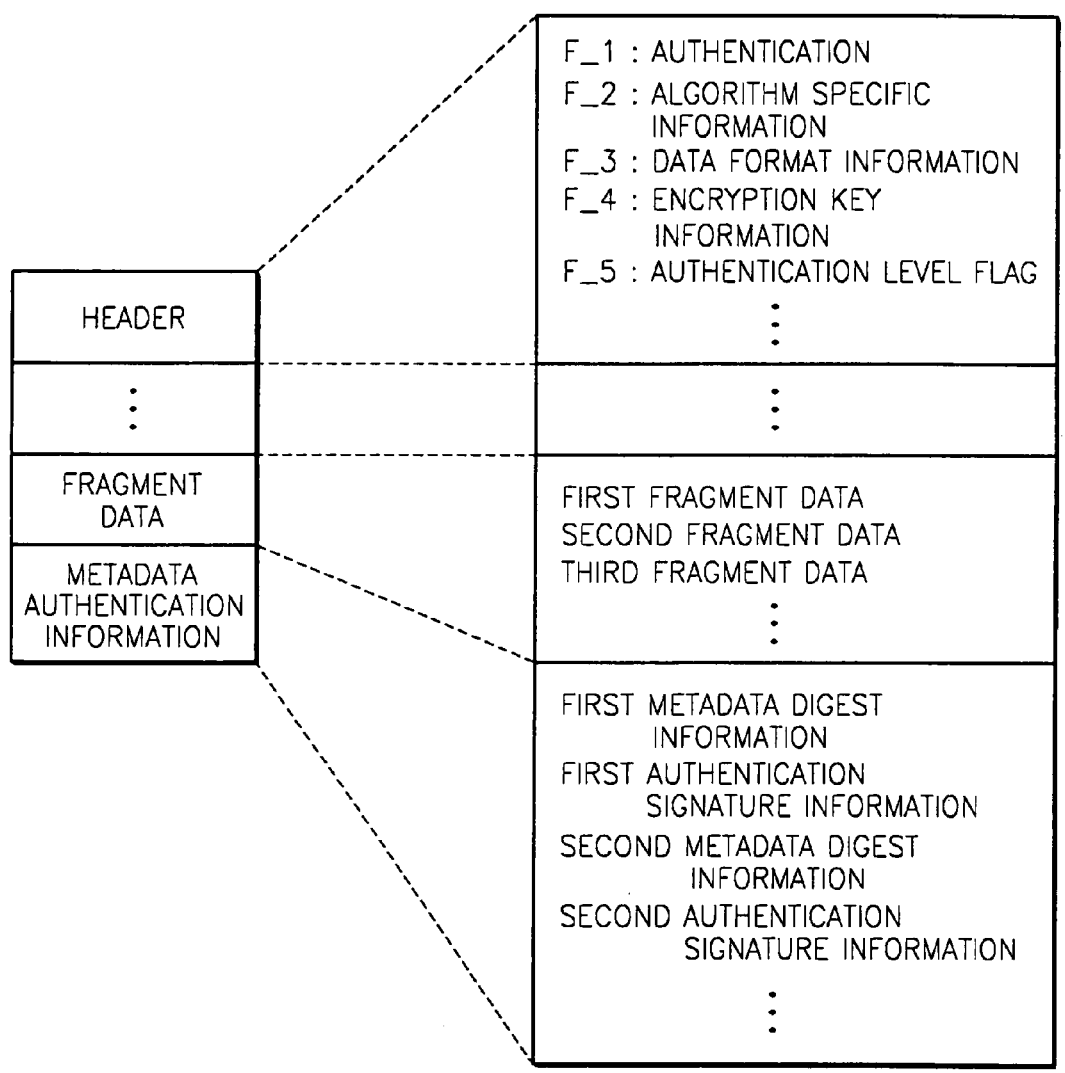
FIG. 3 is a diagram of a metadata container format used for metadata container-level authentication in a unidirectional channel, according to an embodiment of the invention.

FIG. 2 is a diagram illustrating a method of transmitting metadata using different transmission units. In FIG. 2, data units (a), (b) and (c) are different metadata transmission units in communication protocol layers. More specifically, in FIG. 2, data units (a) are metadata transmission packets subject to transmission-level metadata authentication. Transmission-level metadata authentication is performed on each metadata transmission packet (a) shown in FIG. 2 and may be deemed as a typical transport layer metadata authentication, because of a metadata message verification between one network node and another rather than a verification of a source of the metadata message. Each metadata transmission packet (a) has a binary format, typically, for example, a binary Extensible Markup Language (XML) format. In FIG. 2, data units (b) are metadata containers subject to metadata container-level authentication, according to the present invention. According to the present invention, each predetermined semantic unit of metadata can be contained in a metadata container and, accordingly, the metadata container-level authentication can support transmission-level metadata authentication as well as support metadata level or source-level metadata authentication. Examples of such metadata containers are shown in FIGS. 3 and 4. In particular, the metadata container-level authentication may also use a messaging protocol to provide a metadata message-level authentication. For example, an XML-based messaging protocol, such as the Simple Object Access Protocol (SOAP) can be used, thereby providing a SOAP metadata message-level authentication. An example of a SOAP metadata message-level authentication message is shown in FIG. 4. In FIG. 2, data unit (c) is metadata in text format and can be subject to the present invention's metadata-level or source-level metadata authentication. For example, if metadata is defined according to the XML, the metadata (c) shown in FIG. 2 has a text XML format.

FIG. 3 is a diagram of a metadata container format subject to metadata container-level authentication in a unidirectional data channel environment (i.e., a metadata container-level authentication container), according to an embodiment of the present invention. As shown in FIG. 3, a metadata container comprises a header, a fragment data section (i.e., metadata fragment data section), and metadata authentication information. The metadata container-level container header contains control information used for metadata container-level authentication. Typically, the header control information comprises first control information $F\_1$, second control information $F\_2$, third control information $F\_3$, fourth control information $F\_4$, and fifth control information $F\_5$.

The metadata container-level container header control information ranging from the first control information $F\_1$ through the fifth control information $F\_5$, typically, comprises a signal or a flag. For example, in FIG. 3, the first control information $F\_1$ is an authentication flag indicating whether metadata container-level authentication has been performed on the fragment data. The metadata container-level authentication may be performed using a media authentication code (MAC) or a digital signature algorithm (DSA).

In FIG. 3, the second control information $F\_2$ is information on a specific algorithm used for generating the metadata container-level authentication information. The second control information $F\_2$ may be represented by a set of binary codes. The relationship between the specific algorithm and the binary codes is defined in advance and is rendered to a server providing services (i.e., provided to a server providing metadata content) and a client receiving metadata containers.

In FIG. 3, the third control information $F\_3$ is data format information showing in detail the way to apply the $F\_2$ specified metadata container-level authentication algorithm to the fragment data. For example, the fragment data may have a binary XML format or a text XML format, and thus the method of applying the F_2 specified metadata container-level authentication algorithm, which is identified in the second control information F_2, to the fragment data varies depending on the format of the fragment data, and therefore the third control information F_3 specifies the metadata fragment data format.

Typically, the metadata container-level container authentication information (described in more detail below) comprises values obtained by substituting metadata into a unidirectional function, such as a hash function specified in the second control information F_2 as the container-level authentication algorithm information, i.e., the metadata container authentication information are hash values. Therefore, for example, authentication information of metadata fragment data having a text XML format has nothing to do with authentication information of metadata fragment data having a binary XML format. Therefore, the third control information F_3 can be used to specify a fragment data format. In other words, typically, there is a need to identify the format of metadata fragment data used to obtain hash values to determine whether an authentication signature is valid based upon the metadata fragment data and the hash values included in a metadata container received by a client.

In FIG. 3, the fourth control information F_4 is encryption key information concerning metadata container-level authentication. The encryption key information can be inserted into the metadata container together with metadata and then directly transmitted from a server to a client. Alternatively, the encryption key information may be transmitted from the server to the client via an additional security channel.

In FIG. 3, the fifth control information F_5 is an authentication level flag indicating a level of metadata authentication that has been performed via the metadata container-level authentication. For example, when the fifth control information F_5 is set to '0', it indicates that transmission-level metadata authentication has been performed. When the fifth control information F_5 is set to '1', it indicates that source-level metadata authentication has been performed. With the help of the authentication level flag indicating whether a transmission-level or a source-level metadata authentication has been performed, it is possible to determine, using an application program at a client, a reliability level of the metadata transmitted from a server. Based on the reliability of the received metadata, it can further be determined whether to use the received metadata.

In FIG. 3, the metadata container comprises the fragment data storage region where at least one metadata fragment data is contained. A predetermined semantic unit of metadata, for example, information on a program, is inserted into the fragment data region of the metadata container as the metadata fragment data. However, the metadata container of the present invention may also be used to selectively carry arbitrary units of metadata as the metadata fragment data. In addition, a group of related metadata can be transmitted from a service provider to a client by a series of metadata containers. Furthermore, one metadata container can comprise one or more metadata fragments as the metadata fragment data. For example, one of the metadata fragment data may be a sub-tree of an XML tree structure representing the entire metadata.

As described above, typically, the metadata container-level container authentication information are hash values, and comprise metadata digest information as well as the metadata authentication signature information (see FIG. 3). The metadata digest information represents a value obtained by substituting one of the metadata fragment data stored in the metadata fragment data storage region of the metadata container into a unidirectional function, such as the hash function specified in the second control information F_2 as the container-level authentication algorithm information to obtain a hash value. Each metadata digest information is related to its corresponding metadata fragment data using a predetermined pointer. For example, first metadata digest information is related to first metadata fragment data using the predetermined pointer. In the above-described embodiment, a hash function has been used to generate the metadata digest information. However, the present invention is not limited to such a configuration and other functions, having the same unidirectional function characteristics as a hash function, can be used to obtain the metadata digest information.

The metadata authentication signature information of the container-level authentication information is a value obtained by substituting the metadata digest information and an encryption key K into a unidirectional function, for example, the hash function specified in the second control information F_2. Each metadata authentication signature information, like each metadata digest information, is related to its corresponding metadata fragment data using a predetermined pointer. For example, first metadata authentication signature information is related to the first metadata fragment data using the predetermined pointer. Although in the above-described embodiment a hash function has been used to generate the metadata authentication signature information, the present invention is not limited to such a configuration and other functions, having the same characteristics as a unidirectional function of a hash function, can be used to generate the metadata authentication signature information.

FIG. 4 is a Simple Object Access Protocol (SOAP) envelope (SOAP message source code), which is an XML based messaging protocol, used for metadata container-level authentication in a bi-directional channel, according to an embodiment of the invention. In particular, FIG. 4 is a SOAP metadata message-level authentication message, typically used in a bi-directional data channel environment. As shown in FIG. 4, authentication-related information is included in a SOAP header, and metadata fragment data is included in a SOAP body of the SOAP envelope. Among pieces of the authentication-related information contained in the SOAP header, typically, 'Algorithm ID' information, 'SignatureValueBaseType' information, and 'KeyInfo' information correspond to the second control information F_2, the third control information F_3, and the fourth control information F_4, respectively, of the metadata container-level authentication container as shown in FIG. 3. 'Digest' information and 'SignatureValue' information correspond to the metadata digest information and the metadata authentication signature information, respectively, of the metadata container authentication information as described above with reference to FIG. 3. 'AuthenticationLevel' information specifies a level of metadata authentication and corresponds to an authentication level flag, i.e., the fifth control information F_5 of the metadata container-level authentication container as shown in FIG. 3. The SOAP body of the SOAP envelope partitions metadata into predetermined semantic units (i.e., semantically partitions), such as program information, segment information, and so on.

As shown in FIGS. 3 and 4, it is possible to effectively perform encryption management and metadata management by inserting authenticated metadata fragment data and corresponding authentication information into a data container, thereby providing metadata level authentication. The metadata fragment is obtained by partitioning metadata based upon a predetermined semantic unit, and encryption management information, thereby generating a metadata container-level authentication container. In addition, since typically metadata is partitioned into predetermined semantic units, such as program information, segment information, and so on, as shown, for example, in the SOAP body of the SOAP envelop in FIG. 4, it is possible to selectively encrypt the metadata fragment data on a predetermined semantic unit-by-predetermined semantic unit basis. Accordingly, both the metadata container-level authentication and the SOAP metadata message-level authentication can support metadata level authentication, which can also be used to authenticate source of metadata or also provide source-level metadata authentication.

Figure 5:
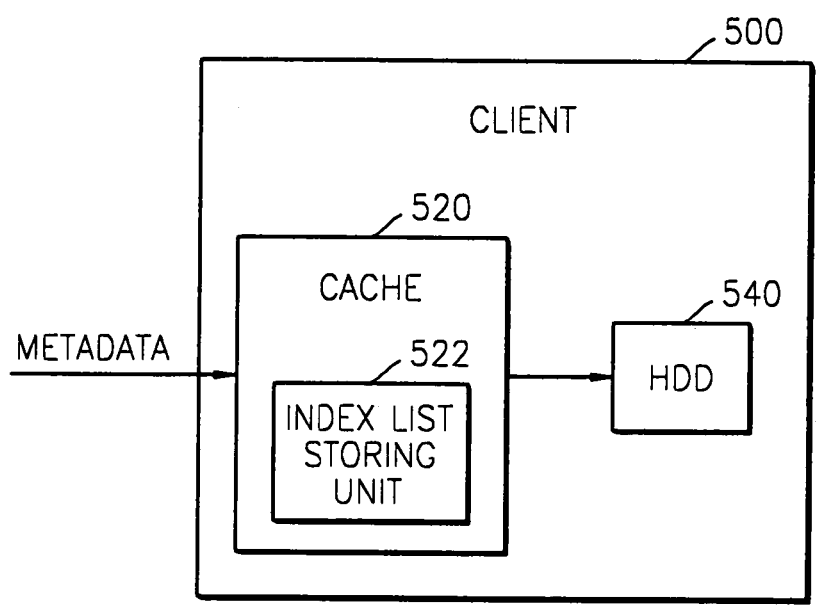
FIG. 5 is a functional block diagram of a client performing metadata classification, which uses index information of metadata, for container-level authentication, according to an embodiment of the invention.

FIG. 5 is a functional block diagram of a client performing metadata classification, which uses index information of metadata, for metadata container-level authentication, according to an embodiment of the present invention. A metadata receiving client 500 comprises a cache 520, an index list storing unit 522, and a data storage 540. Metadata fragment data processing efficiency can be increased for metadata container-level authentication by reducing the metadata fragment authentication information comparison processing in the client 500, for example, by allotting indexing information to each metadata fragment data, by using a corresponding index list stored in the index list storing unit 522, and, by storing in the data storage 540 only predetermined metadata selected and indexed from among all metadata received by or input into the cache 520 from the metadata transmission server.

Figure 6:
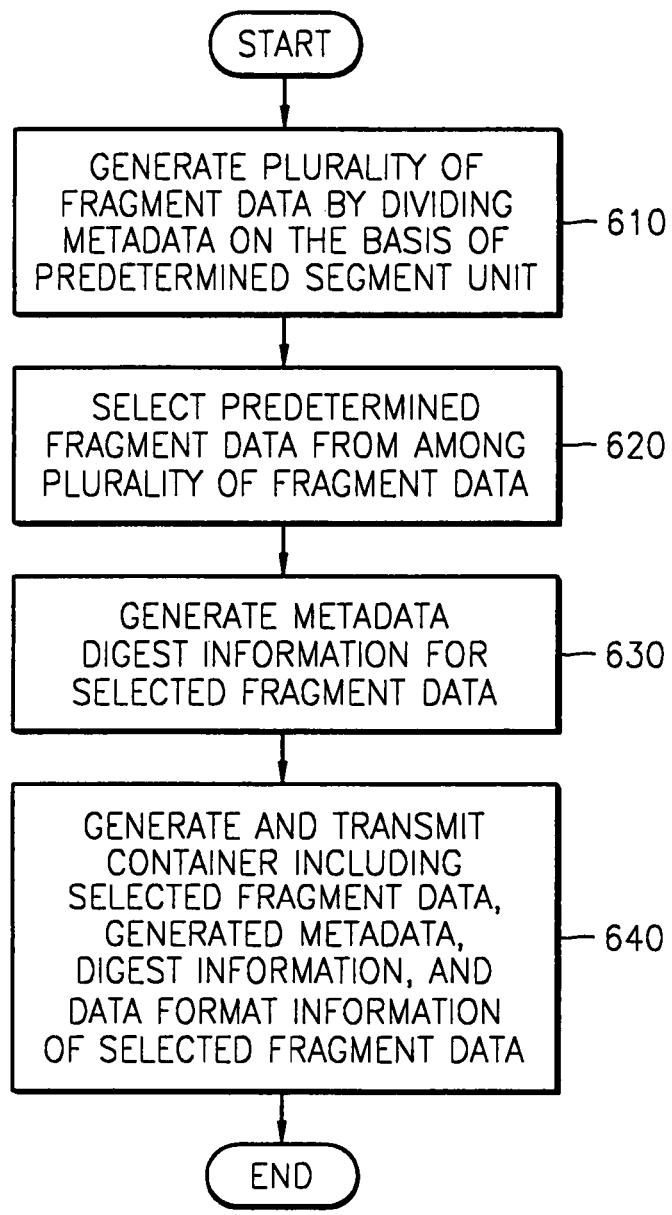
FIG. 6 is a flowchart of metadata container-level authentication in a metadata transmission server, according to an embodiment of the present invention.

FIG. 6 is a flowchart of metadata container-level authentication using the metadata container shown in FIGS. 3 and 4, in a metadata transmission server, according to an embodiment of the present invention. More specifically, FIG. 6 is a flowchart of the operation of the metadata content provider 120 or the service provider 140 of FIG. 1. Referring to FIG. 6, in operation 610, a plurality of metadata fragment data are generated by dividing metadata based upon a predetermined semantic unit. Typically, each generated metadata fragment data is a predetermined semantic unit of metadata that has a predetermined meaning, like program information.

In operation 620, a predetermined metadata fragment data is selected from among the plurality of the generated metadata fragment data. In operation 630, metadata digest information is generated by substituting the selected metadata fragment data into a hash function, for example, a secured hash algorithm, such as SHA-1. In the present described embodiment, a hash function is used to generate metadata container-level authentication message digest information. Sometimes, however, other functions, having the same unidirectional function characteristics as a hash function, can also be used.

In operation 640, a metadata container-level authentication container including the selected metadata fragment data, the generated metadata digest information, and data format information specifying a format type of the selected metadata fragment data, for example, by indicating whether the format of the selected metadata fragment data is binary XML or text XML, is generated and then transmitted to a client. Typically, the format of the selected metadata fragment data is specified using the data format information (the third control information F_3 of the metadata container-level container header), because two different types of metadata fragment data at operation 620 can bring about two different types of metadata digest information in operation 630 even though the two different types of metadata fragment data can be basically the same.

Examples of the metadata container-level authentication container generated in operation 640 are shown in FIGS. 3 and 4. Further, in operation 640, typically, a predetermined authentication flag is set to indicate that metadata container-level authentication has been performed on fragment data of metadata carried by the metadata container-level authentication container (e.g., the first control information F_1 of the metadata container-level container header). Further, information that has been used to generate the metadata digest information may be inserted into the metadata container (e.g., the second control information F_2 of the metadata container-level container header). For example, in a case where the metadata digest information is generated in operation 630 using a hash function, algorithm information indicating that the hash function has been used as an authentication information generation algorithm is inserted into the metadata container. However, in a case where the algorithm information is already well known to both a server and a client, algorithm information may be omitted from the metadata container.

Furthermore, it is also possible to insert a flag specifying a metadata authentication level into the metadata container (e.g., the fifth control information F_5 of the metadata container-level container header). The metadata container-level authentication level flag specifies whether metadata container-level authentication has been performed at a transmission level or at a source level.

In a case where a plurality of metadata fragment data are inserted into the metadata container, metadata digest information corresponding to each of the plurality of the metadata fragment data is contained in the metadata container, and so is pointer information indicating a relationship between each of the plurality of the metadata fragment data and its corresponding metadata digest information. In addition, in a case where a plurality of metadata fragment data are inserted into the metadata container, indexing information for each of the plurality of the metadata fragment data is also contained in the metadata container.

Figure 7:
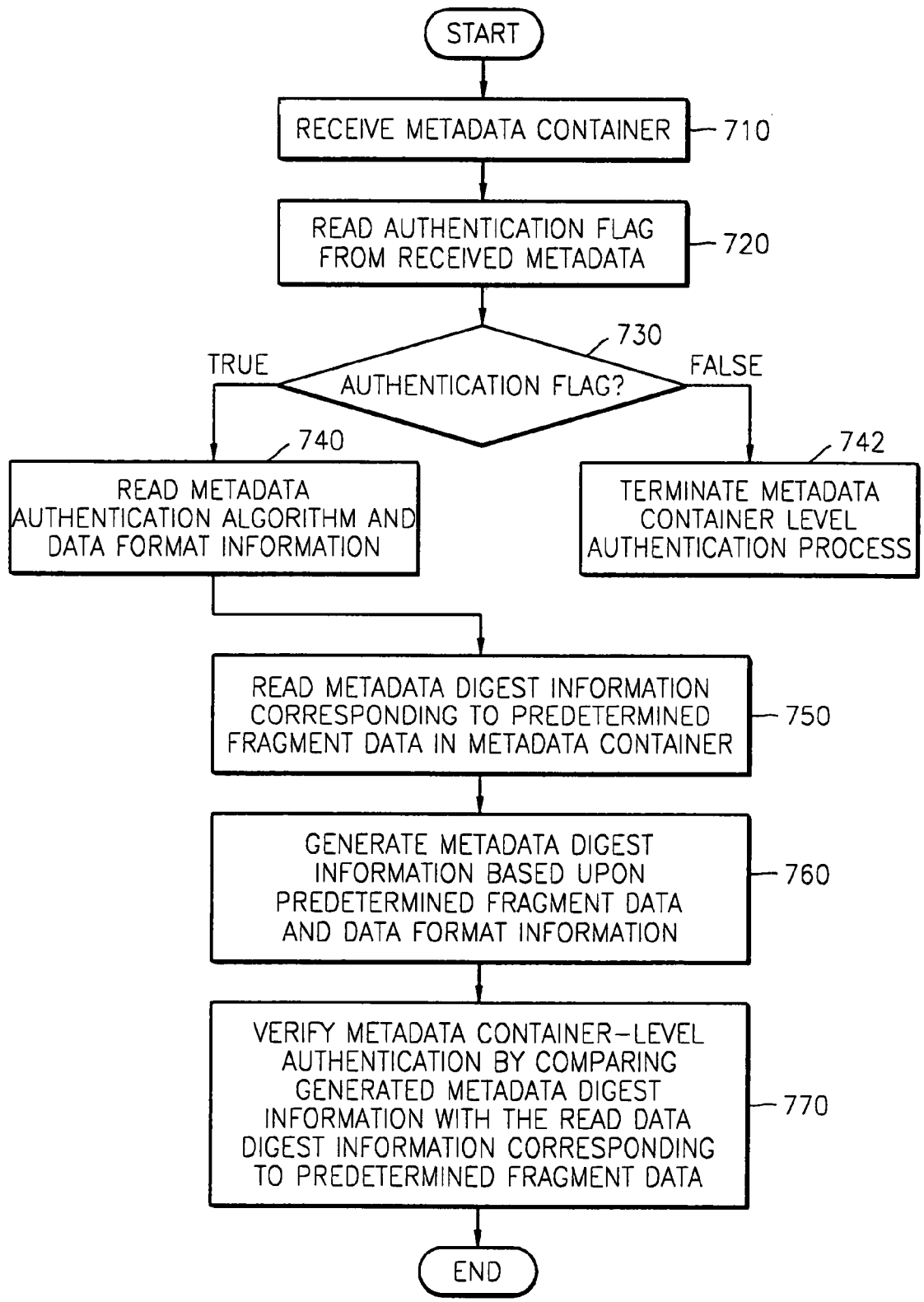
FIG. 7 is a flowchart of metadata container-level authentication in a metadata receiving client, according to an embodiment of the present invention.

FIG. 7 is a flowchart of metadata container-level authentication in a metadata receiving client using the metadata container shown in FIGS. 3 and 4, according to an embodiment of the present invention. More specifically, FIG. 7 is the flowchart of the operation of the client 160 of FIG. 1. Referring to FIG. 7, in operation 710, a metadata container is received from the metadata content provider 120 or the service provider 140 as the metadata transmission server. In operation 720, first control information F_1, i.e., a metadata container-level authentication flag, of a header of the received metadata container is read. In operation 730, if a result of reading the authentication flag shows that metadata container-level authentication has been performed using metadata fragment data contained in the metadata container, the client operation moves on to operation 740. Otherwise, the client operation moves on to operation 742. If operation 730 determines that the metadata container-level authentication flag is not set (i.e., FALSE result), at operation 742 the client terminates the metadata container-level authentication.

In operation 740, an algorithm used for generating metadata digest information included in the metadata container is identified by reading the second control information F_2, i.e., an algorithm used for generating metadata container-level authentication information, of the header of the received metadata container. In the present described embodiment, the algorithm used for generating the metadata container-level authentication information is a hash function. In a case where the algorithm used for generating the metadata container-level authentication information is determined in advance and known to both the metadata content provider 120 (or the service provider 140) and the client 160, the process of reading the metadata container-level authentication algorithm flag F_2 can be omitted. In operation 740, the format of metadata fragment data, used in computing the metadata digest information included in the metadata container, is also identified by reading the third control information F_3, i.e., metadata container-level authentication format information, of the header of the received metadata container.

In operation 750, predetermined metadata fragment data of metadata and its corresponding metadata digest information are read from the received metadata container-level authentication container. In operation 760, metadata digest information is generated based on the metadata fragment data and the metadata fragment data format information read in operation 740 by using the metadata container-level authentication algorithm used for generating the metadata digest information, for example, a hash function. Operation 770 authenticates (verifies) the metadata transmitted from the metadata content provider 120 or the service provider 140 by comparing the metadata digest information generated in operation 760 with the metadata digest information of the predetermined metadata fragment data read in operation 750.

If a metadata container-level authentication level flag is included in the metadata container transmitted from the metadata content provider 120 or the service provider 140, it can be determined whether the metadata container-level authentication is a transmission-level metadata authentication or a source-level metadata authentication by reading the metadata container-level authentication level flag. Therefore, responsive to the metadata container-level authentication at operation 760, it is possible to determine whether to use the metadata transmitted from the metadata content provider 120 or the service provider 140 based upon the reliability of the metadata.

Figure 8:
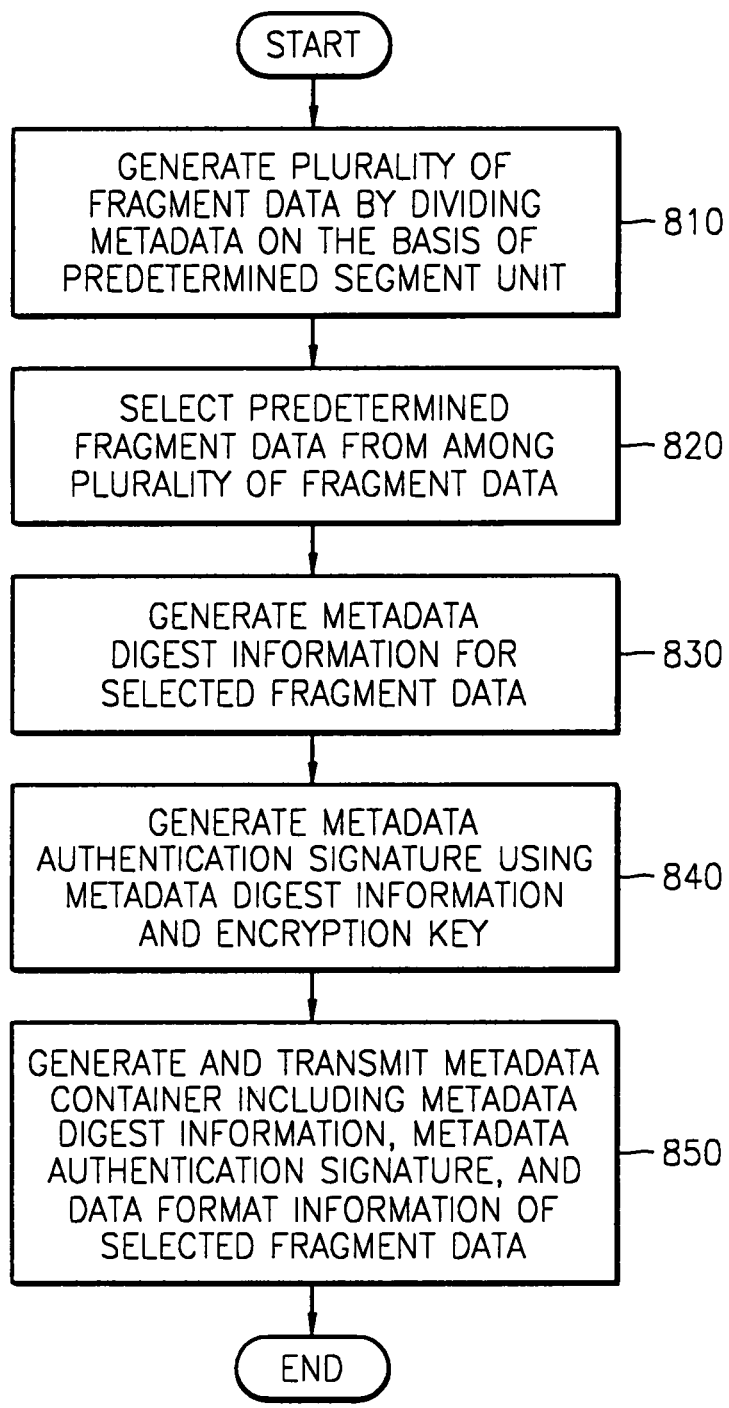
FIG. 8 is a flowchart of metadata container-level authentication in a metadata transmission server, according to another embodiment of the present invention.

FIG. 8 is a flowchart of metadata container-level authentication in a metadata transmission server using the metadata container shown in FIGS. 3 and 4, according to another embodiment of the present invention. More specifically, FIG. 8 is the flowchart of the operation of the metadata content provider 120 or the service provider 140 shown in FIG. 1. Referring to FIG. 8, in operation 810, a plurality of metadata fragment data are generated by partitioning metadata based upon a predetermined semantic unit. Typically, each metadata fragment data is a predetermined semantic unit of to be transmitted metadata, such as program information.

In operation 820, a predetermined fragment data from among the plurality of generated metadata fragment data is selected. In operation 830, metadata digest information is generated by substituting the selected metadata fragment data into a hash function. In the present described embodiment a hash function is used to generate the metadata digest information, however, other functions, having the same characteristics as a unidirectional function of a hash function, can also be used.

In operation 840, a metadata authentication signature is generated by substituting the metadata digest information generated in operation 830 and an encryption key K into the hash function or another function having the same characteristics as a unidirectional function of a hash function. Typically, the encryption key K is specific to the service provider 140. The encryption key K used to generate the metadata authentication signature can be encrypted using another encryption key L. Hereinafter, an encrypted encryption key value obtained using the encryption key L will be represented by E(K). The encrypted encryption key value E(K) is transmitted to the client 160, by being carried in a metadata container. Alternatively, the encrypted encryption key value E(K) can be transmitted to the client 160 via another secure channel. Further, the encryption key L can be transmitted to the client 160 via another secure channel.

In operation 850, a metadata container is generated including the metadata digest information, the metadata authentication signature, and the metadata fragment data format information of the selected metadata fragment data and then the metadata container is transmitted to the client 160 for verification. Examples of the metadata container generated in operation 850 are shown in FIGS. 3 and 4. In operation 850, metadata container-level authentication flag (e.g., first control information F_1 as shown in FIG. 3) is allotted to the generated metadata container to indicate that metadata container-level authentication has been performed based upon metadata fragment data of metadata carried by the metadata container.

Information on an algorithm used for generating the metadata digest information may be inserted into the metadata container (e.g., the second control information F_2 as shown in FIG. 3). In addition, the metadata fragment data format information of the selected metadata fragment data indicates whether the format of the selected metadata fragment data used for generating the metadata digest information and the metadata authentication signature is binary XML or text XML.

In a case where a plurality of metadata fragment data are inserted into the metadata container, metadata digest information and metadata authentication signature for each of the plurality of metadata fragment data are also included in the metadata container. In addition, pointer information indicating a relationship between each of the plurality of metadata fragment data and its corresponding metadata digest information and metadata authentication signature information is further included in the metadata container.

Figure 9:
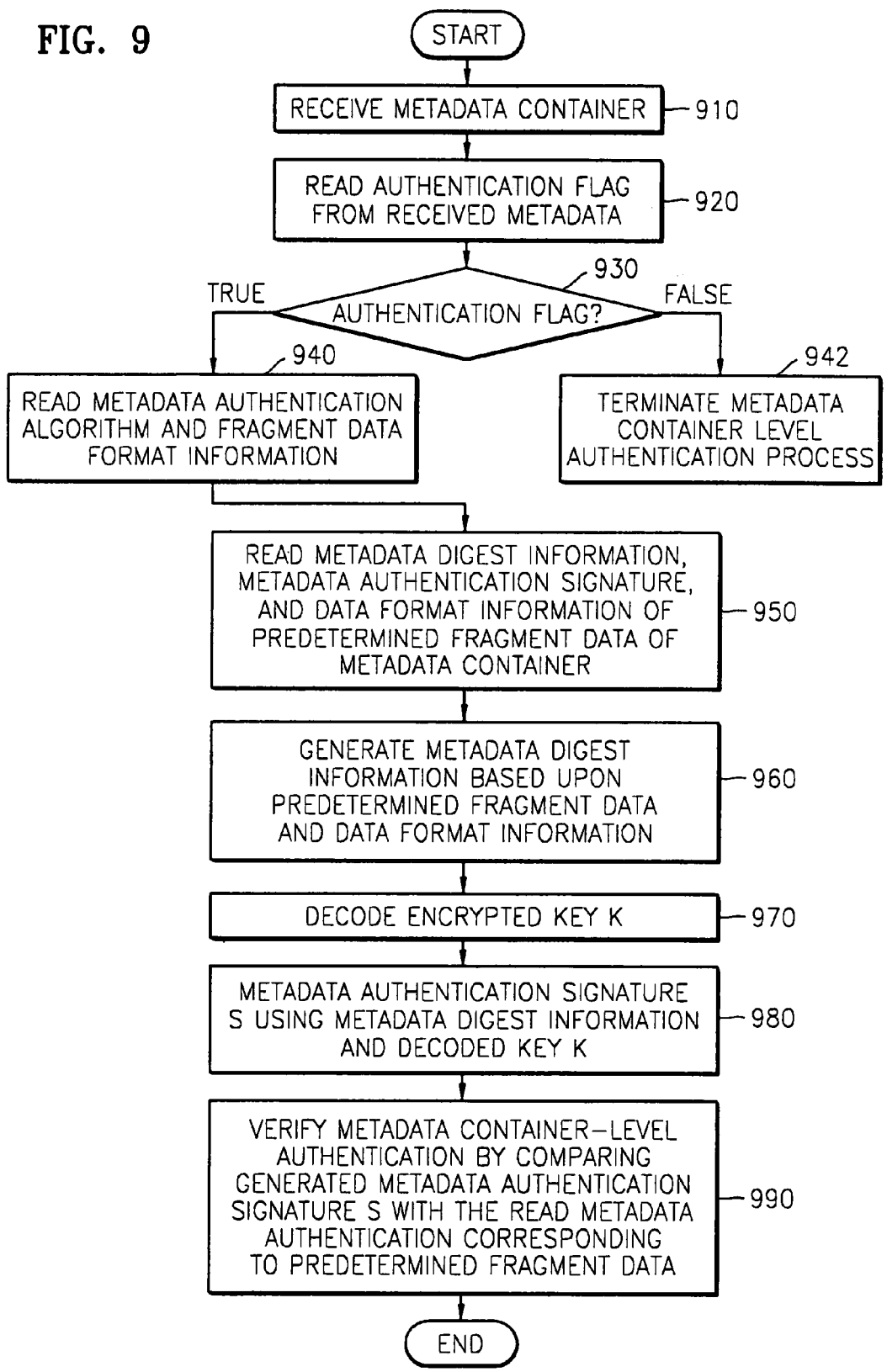
FIG. 9 is a flowchart of metadata container-level authentication in a metadata receiving client, according to another embodiment of the present invention.

FIG. 9 is a flowchart of metadata container-level authentication in a metadata receiving client using the metadata container shown in FIGS. 3 and 4, according to another embodiment of the present invention. More specifically, FIG. 9 is a flowchart of the operation of the client 160 of FIG. 1. Referring to FIG. 9, in operation 910, a metadata container is received from the metadata content provider 120 or the service provider 140. In operation 920, first control information included in a header of the metadata container, i.e., a metadata container-level authentication flag, is read. In operation 930, if a result of reading the metadata container-level authentication flag shows that metadata container-level authentication has been performed on metadata fragment data contained in the metadata container, the client operation moves on to operation 940. Otherwise, the client operation moves on to operation 942 to terminate the metadata container-level authentication.

In operation 940, an algorithm used for generating metadata digest information included in the metadata container is identified by reading second control information F_2, i.e., an algorithm used for generating metadata container-level authentication information, of the header of the received metadata container. In the present described embodiment, the algorithm used for generating the metadata container-level authentication information is a hash function. In a case where the algorithm used for generating the metadata container-level authentication information is determined in advance and known to both the metadata content provider 120 (or the service provider 140) and the client 160, the process of reading the metadata container-level authentication algorithm flag F_2 can be omitted.

In operation 940, the format of metadata fragment data, used in computing the metadata digest information included in the metadata container, is also identified by reading the third control information F_3, i.e., metadata container-level authentication format information, of the header of the received metadata container. In operation 950, predetermined metadata fragment data of metadata contained in the metadata container, and its corresponding metadata digest information, metadata authentication signature information, and metadata fragment data format information are read.

In operation 960, metadata digest information is generated based upon the predetermined metadata fragment data and its corresponding metadata fragment data format information read in operation 950 by using the metadata container-level authentication algorithm read in operation 940, for example, a hash function. In operation 970, an encryption key K that has been encrypted is decrypted using another encryption key L stored in the client 160. Typically, the encryption key L has been transmitted, for example, on another secure transmission channel, from the metadata content provider 120 or the service provider 140 to the client 160. In operation 980, a metadata authentication signature S is generated using the metadata digest information generated in operation 960 and the decrypted key K. Operation 990 authenticates (verifies) the metadata authentication signature received by the client 160 by comparing the metadata authentication signature S generated in operation 980 with the metadata authentication signature information read in operation 950.

The metadata container may further include a metadata container-level authentication level flag indicating the level of metadata container-level authentication performed on the metadata container (i.e., whether a transmission-level or a source-level metadata container-level authentication). Therefore, responsive to the metadata container-level authentication at operation 990, it can be determined whether to use metadata contained in the metadata container.

In addition, various other known methods for testing or protecting message integrity can be used with the present invention's metadata container-level authentication. One of those various methods is cryptography using a public key. According to this method, a service provider possesses a pair of keys (K_s, K_p) and signs a message using the key K_s. Here, K_s indicates a secret key, and K_p indicates a public key. A client can obtain the public key K_p through reliable sources. Therefore, in a case where the client receives a metadata container with the service provider's signature, the client determines the service provider that has transmitted the metadata container and obtains the public key K_p corresponding to the identified service provider. The client verifies whether the received signature is valid using the public key K_p.

Hereinafter, requisites for metadata authentication and a metadata authentication method for preserving the security of metadata according to the present invention will be described in greater detail. To maintain the security of metadata, conventional transmission-level authentication is performed, and in addition, metadata access and use is authorized, metadata integrity and confidentiality are preserved, and the binary format or text format of subgroups of the metadata (i.e., metadata fragment data) is protected (i.e., metadata level or source-level authentication is performed), according to the present invention.

Regarding metadata access and use authorization, access authorization to the entire metadata or part of the metadata can be performed according to predetermined authorization rules. This metadata access authorization process can be performed on each application (i.e., software at a metadata transmitter and a metadata receiver) or for each metadata message. Typically, various operations including 'view', 'modify', and 'copy' may be carried out based on accessing the entire metadata or part of it. 'View' is one of the simplest examples of metadata use and is simply performed by requesting access to the metadata. On the other hand, in the case of modifying or copying all or part of the metadata, a metadata file management system can be used to control the predetermined authorization rules and a metadata message source is authenticated. For example, in the case of copying the metadata using a remote application, for example, in the case of transmitting the metadata from a client to a service provider, a request for the metadata and transmission of the requested metadata and its source authentication information are used.

In addition, it may be necessary to preserve metadata confidentiality to preserve the security of metadata. In some cases, metadata may include highly confidential or private data. Therefore, concerning preserving metadata confidentiality, metadata needs to be encrypted before being transmitted or stored so that it can be prevented from being undesirably exposed to the public. In other words, during transmitting metadata, the confidentiality of the metadata can be preserved by performing transmission-level encryption on the metadata, i.e., either the conventional process of encrypting a transmission unit at the transport layer or according to the present invention encrypt a metadata container-level container of the metadata. Furthermore, in addition to the transmission-level encryption of the metadata, the present invention's metadata level or source-level encryption of the metadata can be performed to substantially preserve the confidentiality of metadata at a transmission level or a storage level by applying authentication information (e.g., encryption) to a metadata fragment and associating information about the applied authentication (i.e., associating authentication information) to the metadata fragment.

Hereinafter, the conventional security of metadata in a unidirectional data channel environment concerning a conditional access system and a bi-directional data channel (Transport Layer Security—TLS) environment will be described in greater detail and then the security of the metadata in the unidirectional data channel and the bi-direction data channel at the transmission level and the metadata level or source level according to the present invention will be described. Here, the unidirectional channel environment concerning a conditional access system includes terrestrial broadcasting, such as ATSC or DVB, and satellite broadcasting, such as Direct TV, cable TV, and IP-multicasting. In the unidirectional channel environment concerning a conditional access system, a unidirectional data channel is used except for a case where data exchanges, such as transactions, are carried out using a return channel.

The conventional metadata transmission-level security functions provided in the unidirectional channel environment concerning a conditional access system are as follows. A receiver and a transmitter with hardware devices automatically authorize each other according to conventional transport layer authentication. In addition, regarding metadata confidentiality, the receiver and the transmitter are enabled to share a common secret via a predetermined channel according to conventional transport layer authentication. Here, the common secret represents a code shared by the receiver and the transmitter. Packet payload is encrypted using the common secret and transmitted. Later, the encrypted packet payload is decrypted using the common secret or using a key decrypted with the use of the common secret.

Regarding conventional metadata transmission-level security functions in the bi-directional channel (TLS) environment, a handshake protocol is used, and a server and a client authorize each other by exchanging and authenticating certificates issued by a third party certificate authorization organization, according to conventional transport layer authentication. Therefore, transmission-level message authentication may be performed using an algorithm, such as DSA or MAC, at the transport layer. In addition, regarding metadata confidentiality, a common secret is shared between the client and the server, and a session key is generated later. Packet payload is encrypted using the session key and then transmitted. The encrypted packet payload is decrypted using the session key. Therefore, conventionally the security of the metadata transmitted between the client and the server at the transmission-level is preserved through transport layer message authentication and encryption of packet payload.

To further keep metadata secured during the transmission of the metadata, typically, the common secret is shared by the receiver and the transmitter in a safe manner, such as a predetermined secure channel, so that the receiver and the transmitter can authorize each other, and data transmitted between the transmitter and the receiver can be encrypted and decrypted using the common secret shared via the predetermined safe channel.

Figure 10:
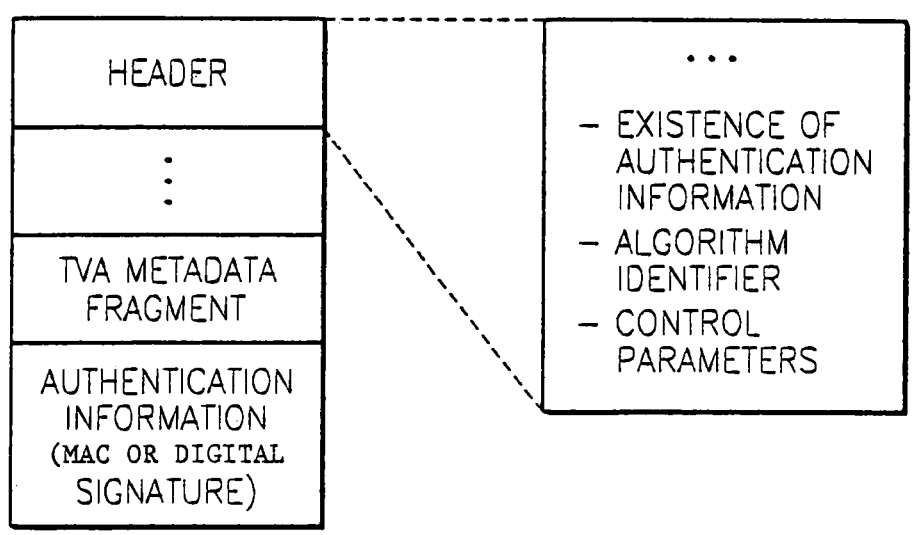
FIG. 10 is another diagram of the metadata container format in a unidirectional channel shown in FIG. 3.

Hereinafter, a method of protecting metadata at a transmission level or at a metadata level or source level using the present invention will be described in greater detail. As for conventionally protecting metadata during the transmission of the metadata at the transmission-level, authentication of and confidentiality between a receiver and a transmitter is carried out at a transport layer as described above. However, authentication of the metadata and preservation of the confidentiality of the metadata can also be carried at a broadcasting system level according to the present invention. For example, in a unidirectional channel, each metadata container-level authentication container can be used as a unit of protection (e.g., by encrypting a metadata container-level authentication container), as shown in FIG. 10. FIG. 10 is another diagram of a metadata container-level authentication container format in a unidirectional data channel environment, according to the present invention. Further, metadata level or source level metadata message authentication can be performed by applying authentication information (e.g., encryption) to a metadata fragment and associating information about the applied authentication (i.e., associating authentication information) to the metadata fragment. For example, in a bi-directional channel, using a SOAP metadata message-level authentication message, authentication signature information corresponding to an authenticated metadata fragment (e.g., encrypted) can be transmitted using a SOAP message. The authentication signature information is included in the body of the SOAP message, as shown in FIG. 11. FIG. 11 is a more detailed SOAP metadata message-level authentication message source code used in a bi-directional data channel environment, according to the present invention.

Hereinafter, a method of preserving metadata confidentiality and controlling metadata access and use in a broadcasting system, which is classified as metadata authentication at a source level, according to the present invention will be described. The preservation of metadata confidentiality in a broadcasting system can be enabled by allotting an authentication signature to a metadata fragment and encrypting the metadata fragment. Given that there may not always be a need to subject the entire metadata to such an encryption process, because of no need to preserve the confidentiality of the entire metadata, according to the present invention specific portions of the metadata are encrypted (i.e., metadata fragment data) and the metadata fragment data that have been encrypted or authenticated are represented with a predetermined pointer. Such metadata fragment authentication can be performed at a source level where the predetermined pointer can be maintained by using a Right Management Protection (RMP) system. Therefore, by using a metadata fragment source level signature, a metadata source can be practically authenticated. Accordingly, metadata level authentication can also support authenticating a source of the metadata. Of course, the metadata must include such encrypted metadata fragment source level information as a source authentication signature.

Regarding metadata access and use authorization, to control or provide metadata access and usage, a standard description of metadata access and usage rights and implementation thereof are provided. A standard description may have an XML schema format or may assume the form of an element of a set of data having a predetermined meaning. Such a standard description may be generated using a conventional markup language, such as XrML, XACML, or SAML. Therefore, typically, a license description and a usage rule of metadata are defined separately from the metadata. In a case where there are many metadata fragments, usage information of which is worth describing, access/usage to the metadata fragments can be easily controlled as follows. Once access to an application (i.e., software at a metadata transmitter and metadata receiver) is authorized, the application operates by following predetermined usage rules set as default values. In this case, an application program interface (API) of an RMP system is used to access or use the metadata. The API is needed when access/usage control information is managed by an RMP system application, for example, by a TV-Anytime RMP (TVA RMP) system. For example, the API issues and authorizes a request to the RMP system application for accessing the metadata. In addition, the API at the metadata receiver can modify, copy and export the metadata.

As described above, there are several types of metadata authentication that can be performed at a predetermined structure level, and they are transmission-level authentication, metadata container-level authentication, including SOAP metadata message-level authentication, and source-level authentication. In the case of metadata level or source-level authentication, authentication information on specific portions of metadata (i.e., metadata fragment data) that have been authenticated is provided using a pointer. In the case of a SOAP message-level authentication, authentication information is included in a header of a SOAP message together with a pointer for part of the metadata contained in the body of the SOAP message or a pointer for the entire metadata. In a case where only metadata confidentiality is requested to be preserved during transmission of the metadata, only conventional transmission-level authentication can be used. On the other hand, in a case where there is a need to secure transmission independence, metadata container-level authentication, including SOAP metadata message-level authentication, of the present invention can satisfy the need. Because the size of metadata contained in a metadata container or a body of an SOAP message can be much larger than the size of a transmission packet, conventional transmission-level authentication can help reduce a system's load, for example, because of the reduced data transmissions or because a security channel may not be necessary. However, considering that the size of a metadata container-level packet is larger than the size of a conventional transmission-level packet, the present invention reduces the number of packets to be transmitted, thus simplifying a system.

Authentication of a metadata source can be achieved using the metadata container-level authentication, including the SOAP metadata message-level authentication of the present invention. The syntax of a SOAP metadata container enabling source authentication is shown in FIG. 11. To perform source authentication on metadata at each node between a source and a final destination, source authentication information needs to be provided to each node between the source and the final destination. More specifically, metadata is authenticated at a predetermined node between a source and a final destination using authentication information transmitted from a previous node, new authentication information is generated, and the metadata and the new authentication information are passed on to a next node. Alternatively, metadata is authenticated at a predetermined node using authentication information transmitted from a previous node, and the metadata and the authentication information are directly passed on to a next node so that the metadata can be authenticated again at the next node using the authentication information.

Accordingly, in the case of transmitting metadata from a source to a final destination while source-level-authenticating the metadata at each node between the source and the final destination, a flag or a signal, indicating whether new authentication information is generated after the metadata is authenticated at a predetermined node using authentication information transmitted from a previous node, can be inserted into the metadata-related authentication information of a metadata container-level authentication container. The flag or signal indicating the presence of source authentication information helps a receiver determine whether to accept the corresponding metadata.

The above-described embodiments of the present invention can be realized as computer-readable codes written on a computer-readable recording medium. The computer-readable recording medium includes all kinds of storages where computer-readable data can be stored, such as a ROM, a RAM, a CD-ROM, a magnetic tape, a hard disk, a floppy disk, a flash memory, and an optical data storage. The computer-readable recording medium can be distributed over computer systems connected via a network so that the computer-readable codes written on the computer-readable recording medium can be executed in an independent manner. More particularly, the above-described processes of the present invention can be implemented in software and/or computing hardware controlling networked computers, for example, as servers (transmitters/providers) and/or clients in case of a client-server network architecture.

As described above, the method of managing metadata according to the present invention makes it possible to authenticate metadata at a metadata container level (i.e., metadata level or source level authentication). Therefore, it is possible to carry out transmission-level or source-level authentication in any directional type (i.e., unidirectional or bi-directional) data channel environment. In addition, the present invention makes it possible to selectively carry out either transmission-level authentication or source-level authentication or both by inserting data format information indicating the format of metadata into a metadata container.

The present invention provides managing metadata security in a metadata transmission server by generating a plurality of metadata fragment data by partitioning metadata to be transmitted based upon predetermined segment units, selecting predetermined metadata fragment data from among the plurality of the metadata fragment data, generating metadata-related authentication information using the selected metadata fragment data, and transmitting the selected metadata fragment data and the metadata-related authentication information including data format information indicating type of the selected metadata fragment data. A metadata receiving client uses the transmitted metadata fragment data, the metadata-related authentication information and the metadata format type information to authenticate the received metadata.

Accordingly, the present invention provides a method of authenticating metadata in a metadata transmission system by transmitting a metadata authentication container comprising a fragment of the metadata and authentication information of the metadata fragment, and authenticating the metadata based upon generated metadata fragment authentication information and the transmitted container metadata fragment authentication information. For example, the present invention provides a multimedia metadata authentication system, comprising a metadata transmission server comprising a programmed computer processor controlling the server according to a process of partitioning to be transmitted metadata into fragments, generating a metadata authentication data container comprising one of the metadata fragments and metadata fragment authentication information using the one metadata fragment, and transmitting the metadata authentication container; and a metadata receiving client comprising a programmed computer processor controlling the client according to a process of generating metadata fragment authentication information using the transmitted metadata fragment and the container metadata fragment authentication information, and authenticating the transmitted metadata by comparing the generated metadata fragment authentication information with the transmitted container metadata fragment authentication information. Further, the present invention provides a machine readable storage storing at least one computer program controlling networked computers according to a process of performing metadata transmission-level or source-level authentication in any directional type data channel environment by partitioning to be transmitted metadata into fragments, and processing (i.e., transmitting and receiving) a metadata authentication data container comprising at least one of the metadata fragments and metadata fragment authentication information using the one metadata fragment and a data format type of the metadata.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of managing metadata in a client device that receives the metadata, the method comprising:
   reading predetermined metadata fragment data, metadata-related information, and data format information indicating a data format type of the predetermined metadata fragment data, from the received metadata, wherein each of the predetermined metadata fragment data, the metadata-related information, and the data format information are received in a metadata container;
   generating, using a processor, metadata-related information by using the predetermined metadata fragment data and the read data format information; and
   determining whether the received metadata has been authenticated by comparing the generated metadata-related information with the read metadata-related information.

2. The method of claim 1, wherein the data format information indicates whether the predetermined metadata fragment data has a binary XML format or a text XML format.

3. The method of claim 1, wherein an authentication level flag specifying a metadata authentication level is further included in the metadata container.

4. The method of claim 1, wherein the metadata-related information is metadata digest information obtained by substituting the predetermined metadata fragment data into a unidirectional function.

5. The method of claim 4, wherein the unidirectional function is a hash function.

6. The method of claim 1, wherein a plurality of metadata fragment data and corresponding metadata-related information are included in the metadata container, and each metadata fragment data and the corresponding metadata-related information is connected to each other by pointer information; and
the metadata-related information reading comprises correlating the received metadata fragment data and a corresponding metadata-related information according to the pointer information.

7. A method of managing metadata in a client device that receives the metadata, the method comprising:
receiving a metadata container including metadata fragment data of the received metadata, metadata-related information, data format information indicating a type of the metadata fragment data, metadata authentication signature information, and an encrypted first encryption key;
generating, using a processor, metadata-related information by using the metadata fragment data of the received metadata and the data format information;
decrypting the encrypted first encryption key using a second encryption key stored in the client device;
generating metadata authentication signature information using the generated metadata-related information and the decrypted first encryption key; and
determining whether the received metadata has been authenticated by comparing the generated metadata authentication signature information with the received metadata authentication signature information.

8. The method of claim 7, wherein the metadata-related information is metadata digest information obtained by substituting the metadata fragment data into a unidirectional function.

9. The method of claim 8, wherein the unidirectional function is a hash function.

10. The method of claim 7, wherein the generated metadata authentication signature information is obtained by substituting the generated metadata-related information and the decrypted first encryption key into a unidirectional function.

11. The method of claim 10, wherein the unidirectional function is a hash function.

12. The method of claim 7, wherein the metadata fragment data, the metadata-related information, the data format information, the metadata authentication signature information, and the encrypted first encryption key are received in a metadata container.

13. The method of claim 7, wherein the data format information indicates whether the metadata fragment data used to generate the metadata-related information has a binary XML format or a text XML format.

14. The method of claim 12, wherein an authentication level flag specifying a metadata authentication level is further included in the metadata container and the determining of the metadata authentication is according to the authentication level flag.

15. The method of claim 12, wherein a plurality of metadata fragment data and corresponding respective metadata-related information and metadata authentication signature information are inserted into the metadata container, and each metadata fragment data and the corresponding metadata-related information and metadata authentication signature information are connected to one another by pointer information; and
the receiving of the authentication signature information of the metadata fragment data comprises correlating the received metadata fragment data and a corresponding metadata authentication signature information according to the pointer information.

16. A metadata transmission server managing metadata security of a multimedia system, the server comprising:
a programmed computer processor controlling the server according to a process of:
generating, using the processor, a plurality of metadata fragment data by partitioning metadata to be transmitted based upon a predetermined semantic unit,
selecting a predetermined metadata fragment data from among the plurality of metadata fragment data,
generating metadata-related information by using the selected metadata fragment data, and
transmitting a container including the selected metadata fragment data, the metadata-related information, and a header including data format information indicating a data format type of the selected metadata fragment data,
wherein the metadata-related information comprises values obtained by substituting the selected metadata fragment data into a unidirectional function, which function varies depending on the data format type indicated in the header.

17. A multimedia metadata authentication management system, comprising:
a metadata transmission server comprising a programmed computer processor controlling the server according to a process of:
generating, using the processor, a plurality of metadata fragment data by partitioning metadata to be transmitted based upon a predetermined semantic unit,
selecting a predetermined metadata fragment data from among the plurality of metadata fragment data,
generating metadata-related information using the selected metadata fragment data, and
transmitting a container including the selected metadata fragment data, the metadata-related information, and a header including data format information indicating a data format type of the selected metadata fragment data; and
a metadata receiving client comprising a second programmed computer processor controlling the client according to a process of:
receiving the metadata fragment data, the metadata-related information and the data format information indicating the type of the metadata fragment data, transmitted from the metadata transmission server,
generating metadata-related information by using the transmitted metadata fragment data and the data format information, and
determining whether the received metadata has been authenticated by comparing the generated metadata-related information with the transmitted metadata-related information.

18. A metadata authentication system, comprising:
a metadata transmission server comprising a programmed computer processor controlling the server according to a process of:
partitioning to be transmitted metadata into fragments based upon a predetermined semantic unit,
generating a metadata authentication container comprising a metadata fragment of the plurality of partitioned metadata fragments, metadata fragment authentication information obtained from the metadata fragment, and data format information indicating a data format type of the metadata fragment;

transmitting the metadata authentication container; and a metadata receiving client comprising a programmed computer processor controlling the client according to a process of:

generating metadata fragment authentication information by using the transmitted metadata fragment and the data format information indicating the data format type of the metadata fragment, and authenticating the transmitted metadata by comparing the generated metadata fragment authentication information with the metadata fragment authentication information included in the transmitted metadata authentication container.

19. The system of claim 18, wherein a format of the metadata authentication container comprises a header section, a metadata fragment section and a metadata fragment authentication information section.

20. The system of claim 19, wherein the metadata authentication container is defined according to a simple object access protocol (SOAP) message.

21. The system of claim 20, wherein the SOAP message comprises a SOAP header comprising the metadata fragment data authentication information and a SOAP body comprising the metadata fragment.

22. The system of claim 18, wherein the programmed computer processor of the metadata transmission server further:

includes a plurality of the metadata fragments in the metadata authentication container, allots indexing information to each included metadata fragment, and includes the indexing information in the metadata authentication container; and the metadata receiving client further comprises a data storage storing an index list and predetermined metadata fragments, and the programmed computer processor of the metadata receiving client uses the stored predetermined metadata fragments according to the metadata authentication container indexing information and the stored index list to generate the metadata fragment authentication information.

23. The system of claim 18, wherein the programmed computer processor of the metadata transmission server further:

includes a plurality of the metadata fragments and corresponding metadata fragment authentication information in the metadata authentication container, includes pointer information connecting each included metadata fragment to the corresponding metadata fragment authentication information; and the programmed computer processor of the metadata receiving client determines the transmitted container metadata fragment authentication information of the transmitted metadata fragment based upon the pointer information.

24. The system of claim 23, wherein the metadata transmission server comprises a right management protection system to maintain the pointer information as a source level authentication of the transmitted metadata.

25. The system of claim 18, wherein the metadata fragment authentication information is encryption management information regarding encryption of the fragment data.

26. A method of authenticating metadata in a metadata transmission system, the method comprising:

receiving a container comprising a fragment of metadata wherein the fragment has been generated by partitioning metadata based upon a predetermined semantic unit, metadata fragment authentication information generated from the metadata fragment, and data format information indicating a data format type of the metadata fragment;

generating metadata fragment authentication information by using the metadata fragment and the data format information included in the received container; and authenticating, using a processor, the metadata fragment by comparing the generated metadata fragment authentication information with the metadata fragment authentication information included in the received container.

27. A metadata receiving client receiving metadata from a metadata transmission server via a network, the metadata receiving client comprising:

a programmed computer processor controlling the metadata client according to a process of:

receiving a metadata authentication data container from the metadata transmission server, the container comprising a metadata fragment wherein the metadata transmission server has generated the metadata fragment by partitioning metadata based upon a predetermined semantic unit, metadata fragment authentication information generated from the metadata fragment, and data format information indicating a data format type of the metadata fragment;

generating metadata fragment authentication information by using the transmitted metadata fragment and the data format information indicating the data format type of the metadata fragment; and authenticating the metadata received in the container by comparing the generated metadata fragment authentication information with the transmitted container metadata fragment authentication information.

28. A non-transitory machine readable storage medium storing at least one computer program controlling networked computers according to a process comprising:

receiving a container comprising a fragment of metadata wherein the fragment has been generated by partitioning metadata based upon a predetermined semantic unit, metadata fragment authentication information generated from the metadata fragment, and data format information indicating a data format type of the metadata fragment;

generating metadata fragment authentication information by using the metadata fragment and the data format information included in the received container; and authenticating the metadata fragment by comparing the generated metadata fragment authentication information with the metadata fragment authentication information included in the received container.

29. A non-transitory machine readable storage medium storing at least one computer program controlling networked computers according to a process comprising:

reading predetermined metadata fragment data, metadata-related information, and data format information indicating a data format type of the predetermined metadata fragment data, from the received metadata, wherein each of the predetermined metadata fragment data, the metadata-related information, and the data format information are received in a metadata container;

generating metadata-related information by using the predetermined metadata fragment data and the read data format information; and determining whether the received metadata has been authenticated by comparing the generated metadata-related information with the read metadata-related information.

30. A non-transitory machine readable storage medium storing at least one computer program controlling networked computers according to a process comprising:
- receiving a metadata container including metadata fragment data of the received metadata, metadata-related information, data format information indicating a type of the metadata fragment data, metadata authentication signature information, and an encrypted first encryption key;
- generating metadata-related information by using the metadata fragment data of the received metadata and the data format information;
- decrypting the encrypted first encryption key using a second encryption key stored in the client device;
- generating metadata authentication signature information using the generated metadata-related information and the decrypted first encryption key; and
- determining whether the received metadata has been authenticated by comparing the generated metadata authentication signature information with the received metadata authentication signature information.

* * * * *